United States Patent Office 3,442,421
Patented May 6, 1969

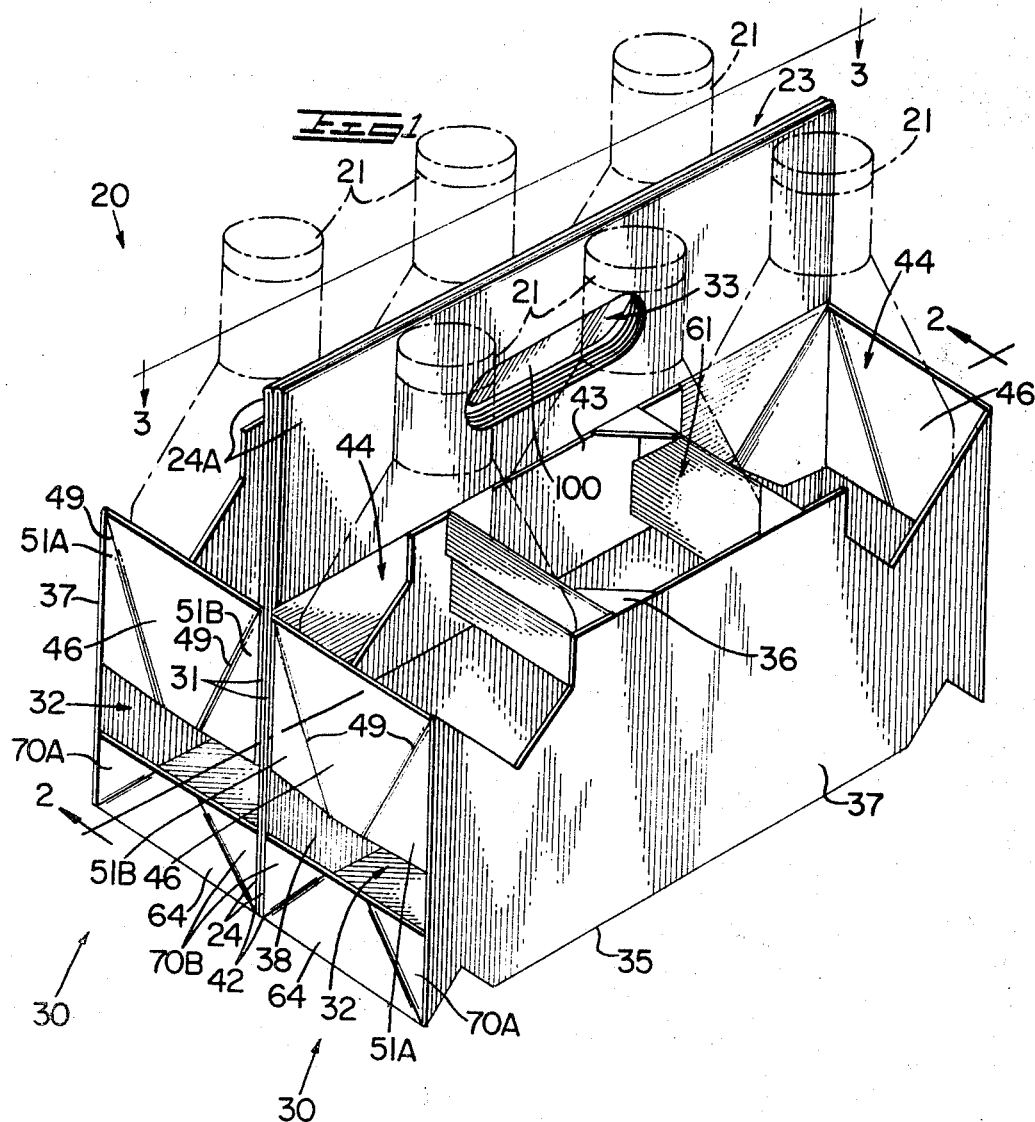

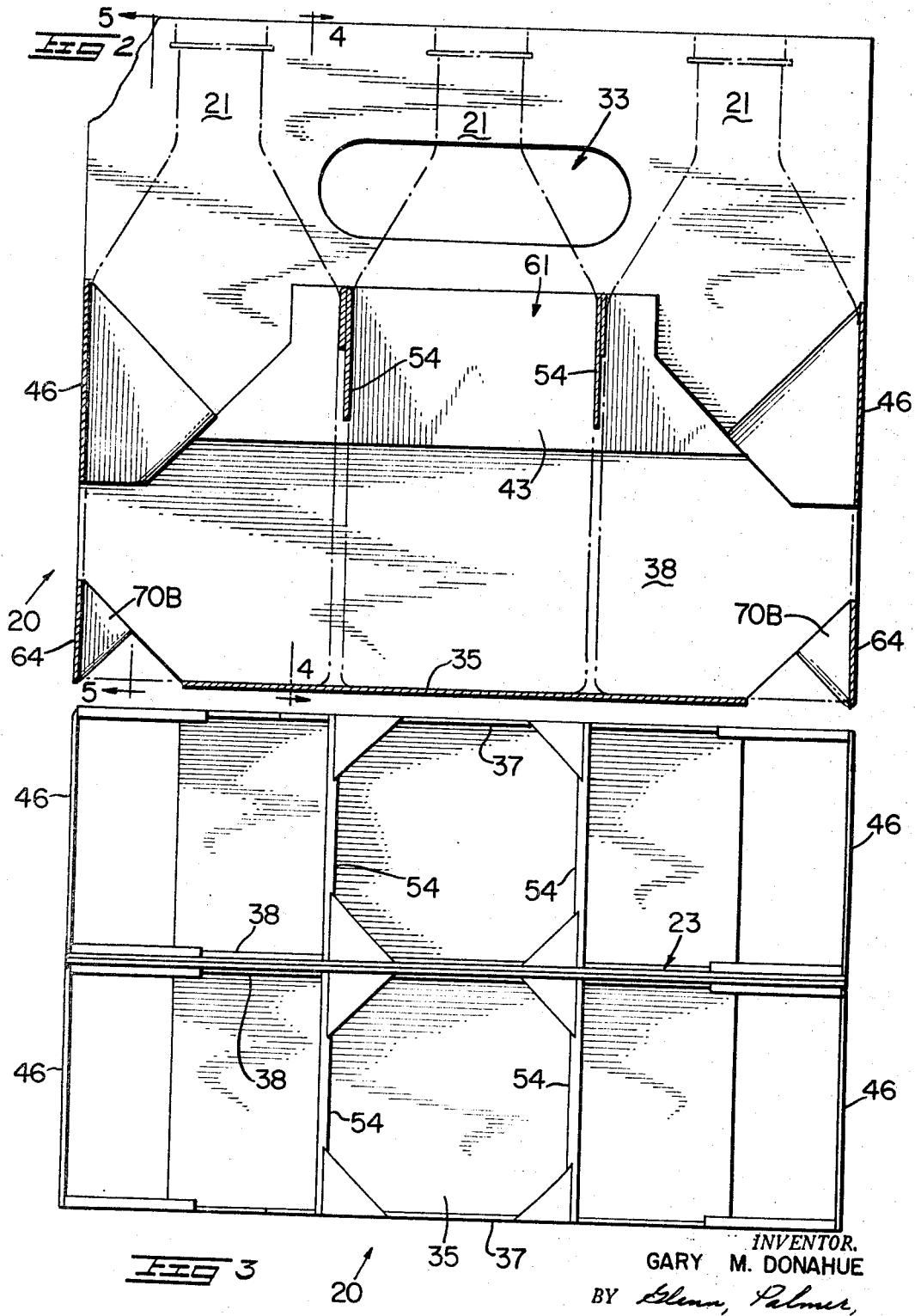

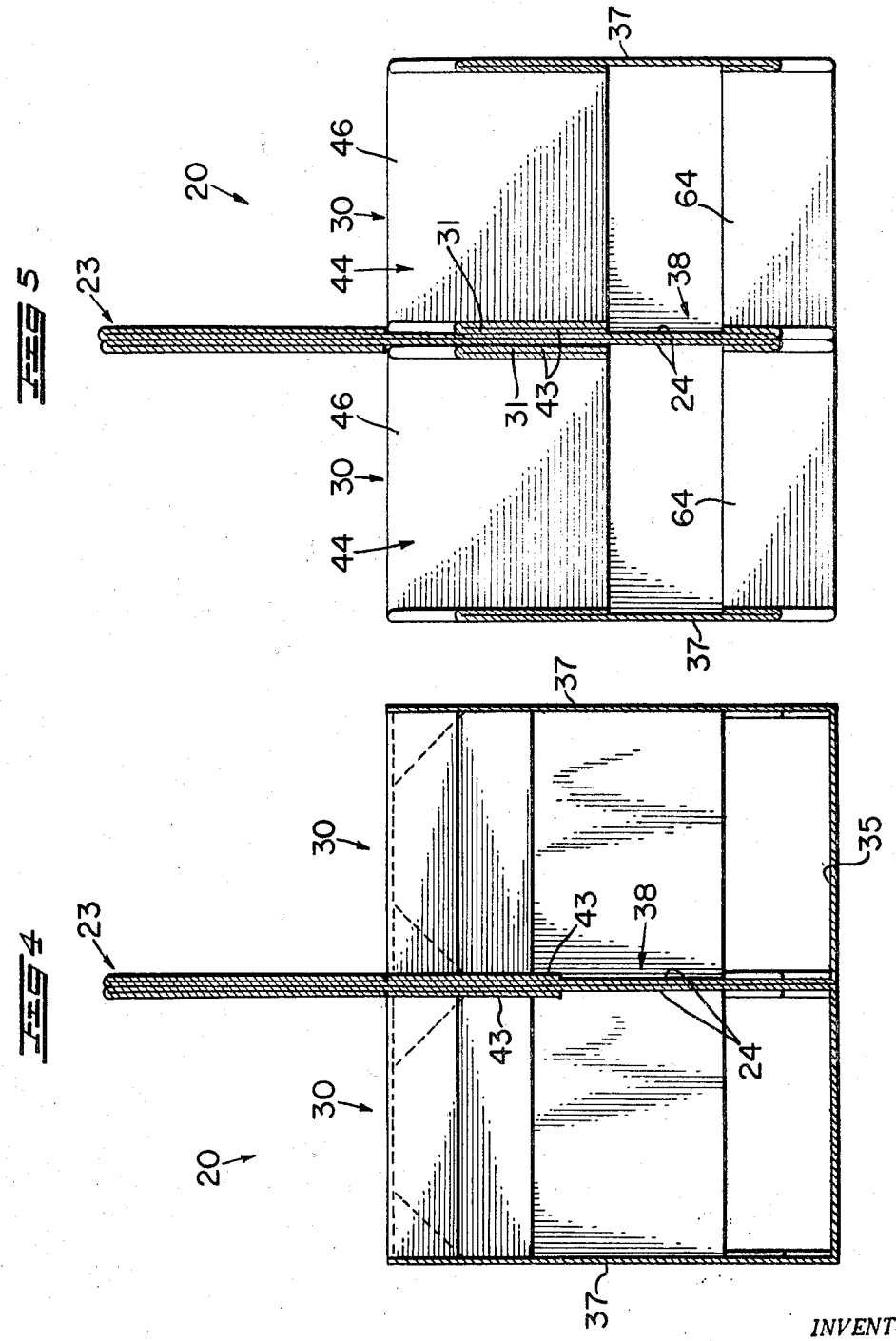

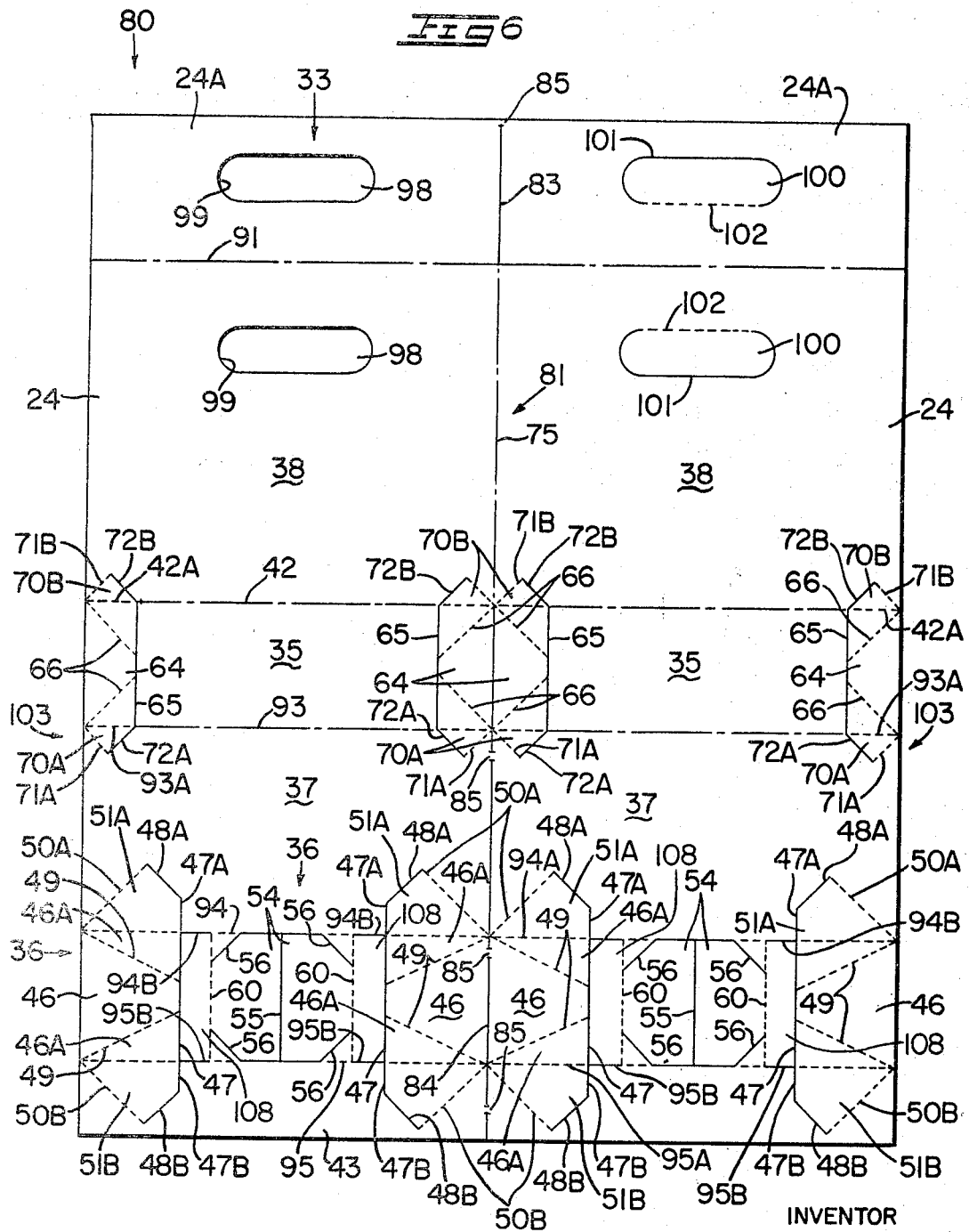

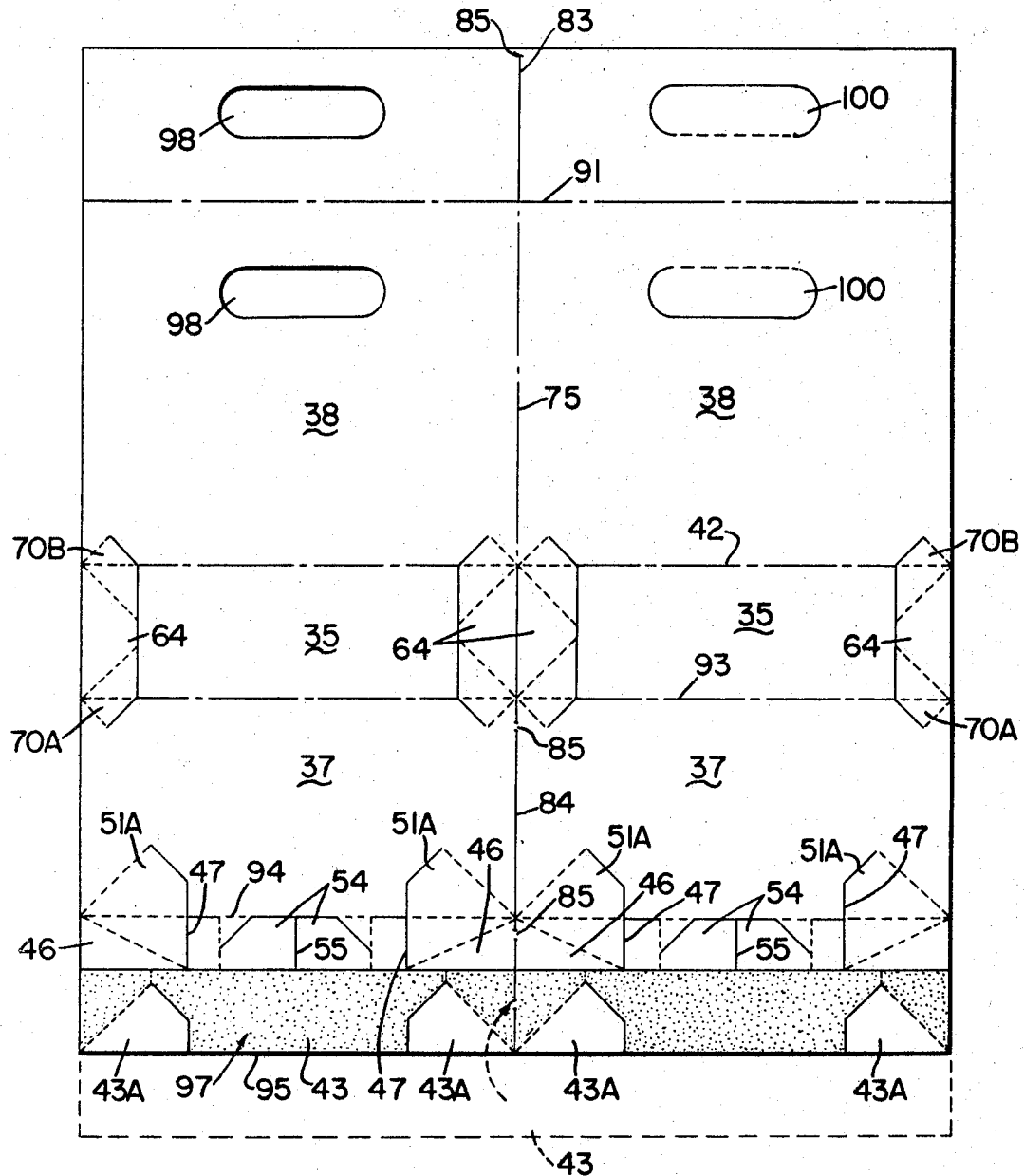

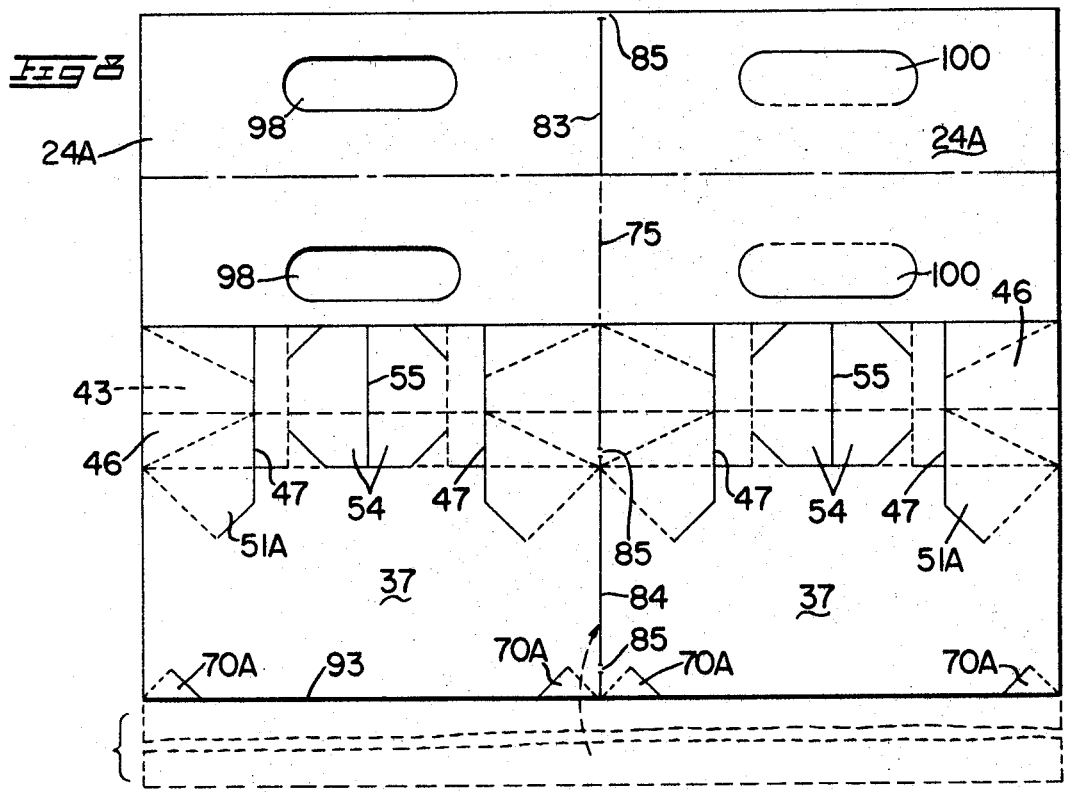
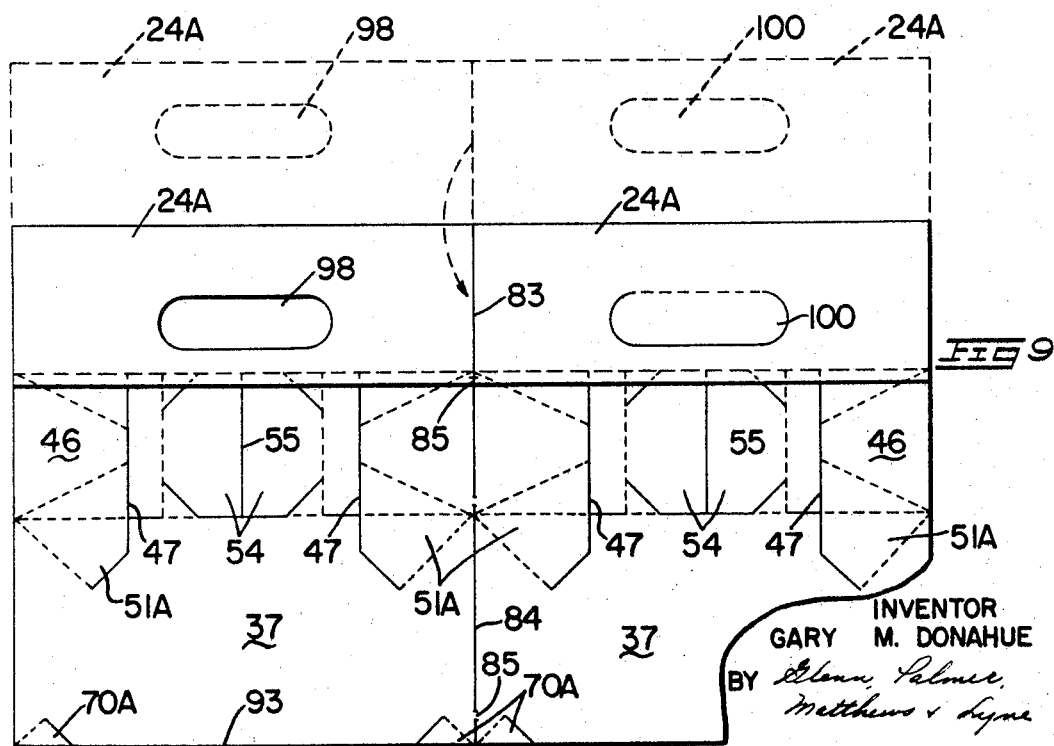

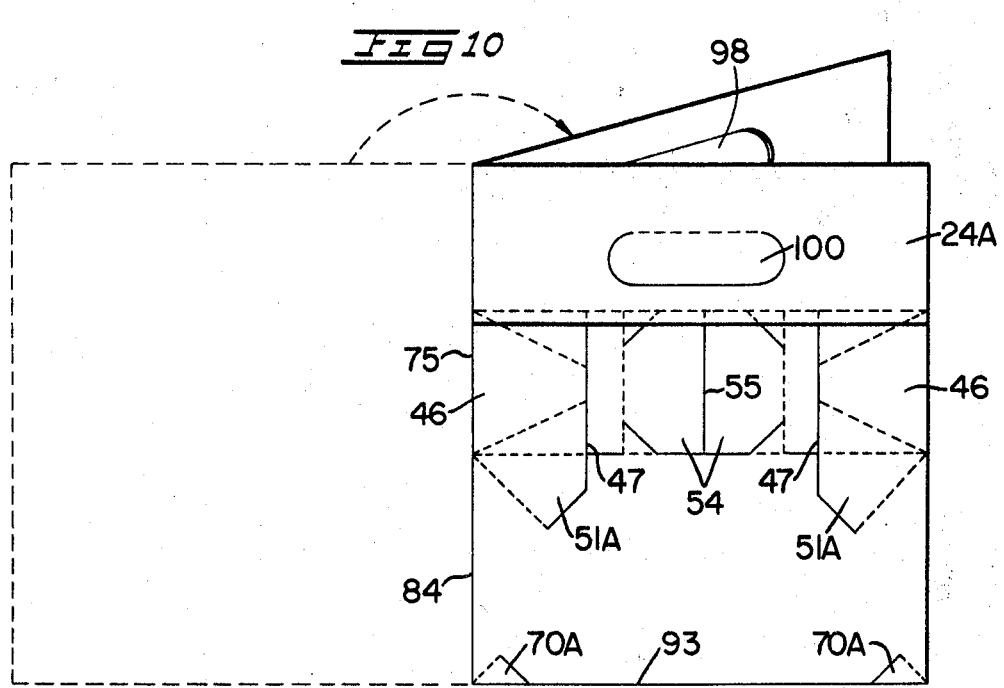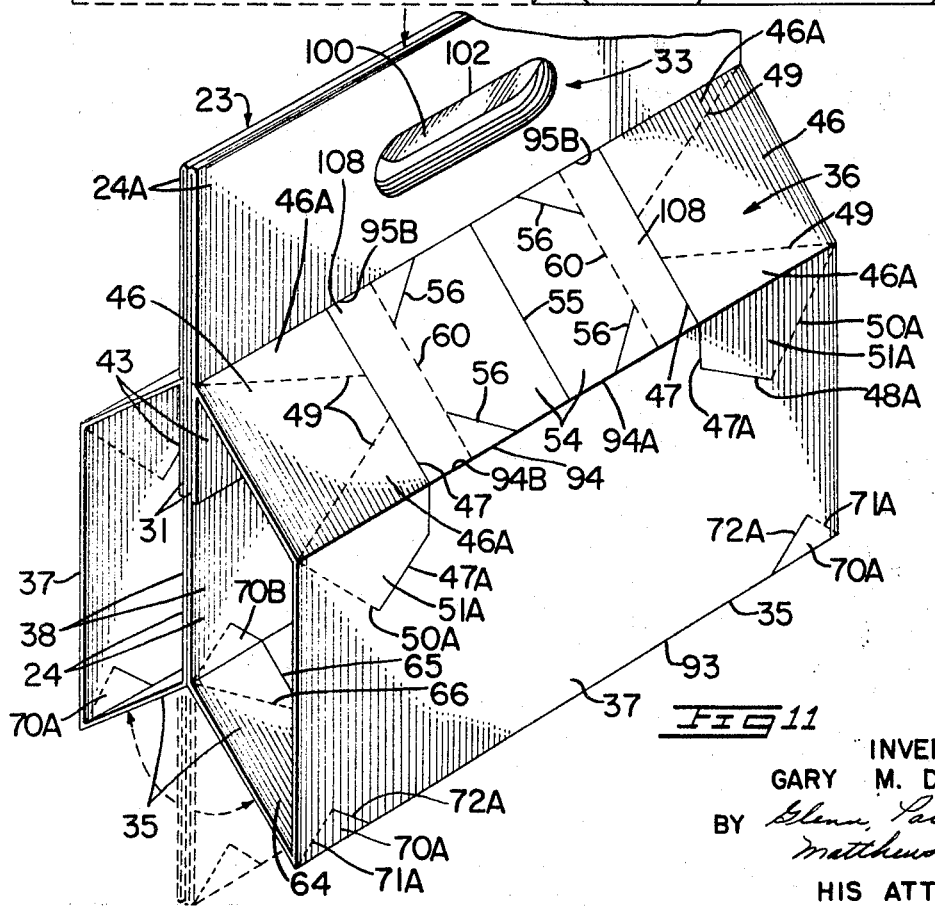

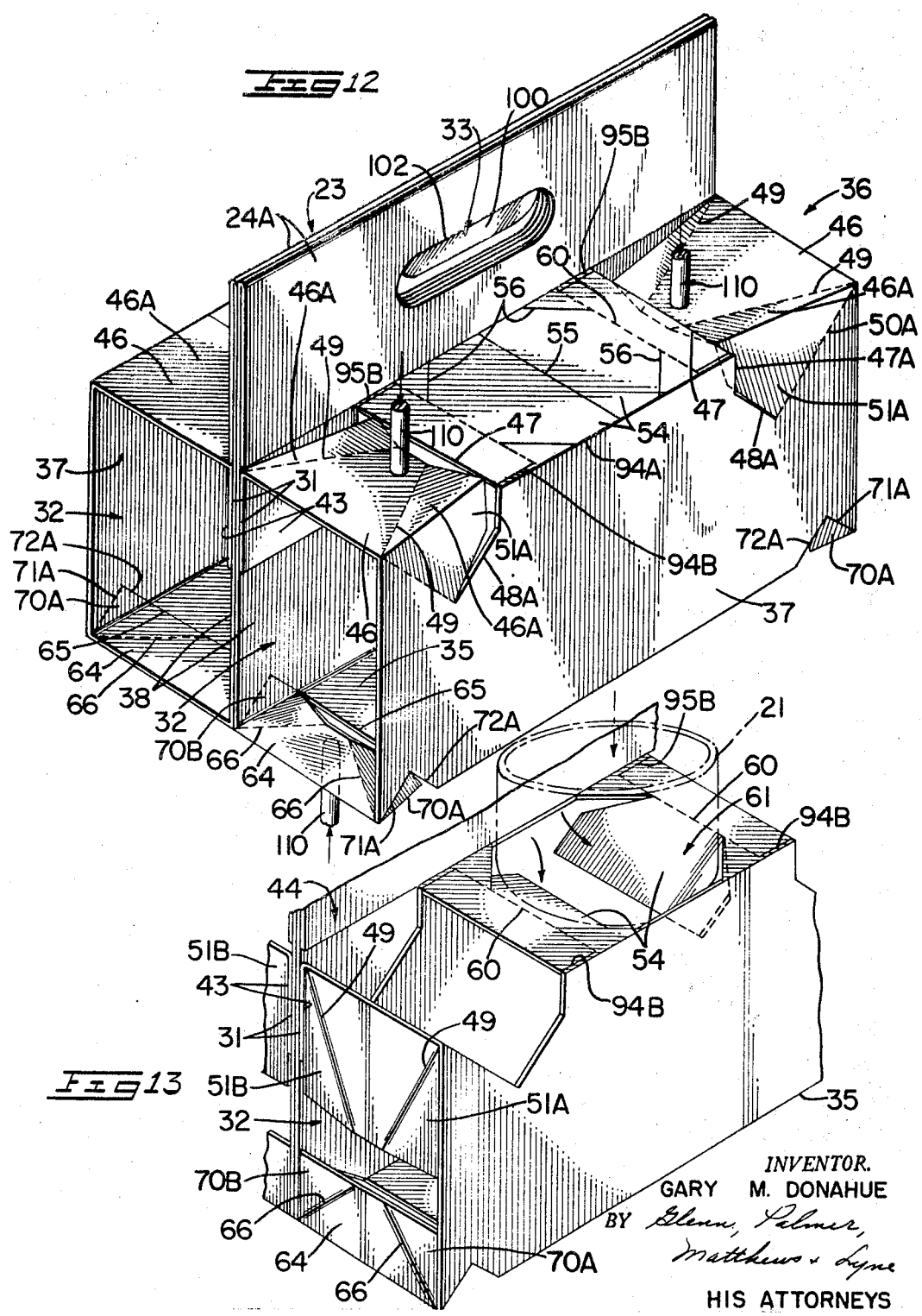

3,442,421
CARRIER FOR BOTTLE-LIKE CONTAINERS,
METHOD OF MAKING SUCH CARRIER, AND
BLANKS FOR MAKING SAME
Gary M. Donahue, Chesterfield County, Va., assignor to
Reynolds Metals Company, Richmond, Va., a corporation of Delaware
Filed Jan. 23, 1967, Ser. No. 610,936
Int. Cl. B65d 75/00, 5/48
U.S. Cl. 220—114                                                5 Claims

ABSTRACT OF THE DISCLOSURE

This disclosure relates to an improved carrier for a plurality of bottle-like containers wherein such carrier has a central vertical partition made of a pair of structural layers which extend the full height thereof and each structural layer has integral tubular compartment means foldably fastened thereto along a single continuous adhesive strip means with opening means in each compartment means for receiving such bottle-like containers, to a method of making such carrier in a simple and inexpensive manner, and to substantially rectangular blanks for making same.

---

This invention relates to carriers and more particularly to an improved carrier for bottle-like containers, to a method for making such a carrier, and to blanks for making same.

Many products such as beverages, for example, are commonly sold in cans or bottles wherein a plurality of four, six or eight bottles, for example, are packaged in an easily carried carrier. It is especially desirable, particularly in the case of beverages sold in nonreturnable bottles, to provide a high strength carrier for a plurality of such bottles which can be made simply and economically and with minimum waste of material.

Accordingly, it is a feature of this invention to provide an improved carrier for a plurality of bottle-like container means which is of high strength and of simple and economical construction.

Another feature of this invention is to provide an improved carrier of the character mentioned comprising a central vertical partition having a pair of tubular compartment means each adapted to carry a plurality of bottle-like container means therewithin wherein each compartment means is fastened along an associated side of such central vertical partition along a single continuous adhesive strip means.

Another feature of this invention is to provide an improved carrier of the character mentioned which is made from a simple blank of substantially rectangular outline and which is made with essentially no waste of blank material.

Another feature of this invention is to provide an improved method of making a carrier of the character mentioned in a simple and economical manner using standard carton forming equipment.

Another feature of this invention is to provide an improved method of making such a carrier which is adhesively held together along a single continuous adhesive strip means which is easily applied in a high volume production operation and which enables rapid assembly of such carrier.

Therefore, it is an object of this invention to provide an improved carrier and an improved method of making such carrier having one or more of the novel features of this invention as set forth above or hereinafter shown or described.

Another object of this invention is to provide improved blanks for making such a carrier, or the like.

Other objects, uses, and advantages of this invention are apparent from a reading of this description which proceeds with reference to the accompanying drawings forming a part thereof and wherein:

FIGURE 1 is a perspective view illustrating an exemplary carrier of this invention with a plurality of six bottle-like containers or bottles supported therewithin.

FIGURE 2 is a sectional view on the line 2—2 of FIGURE 1 also showing the outlines of the bottles carried within such carrier in dotted lines.

FIGURE 3 is a view on the line 3—3 of FIGURE 1 with the bottles removed.

FIGURE 4 is a sectional view on the line 4—4 of FIGURE 2 with such bottles removed.

FIGURE 5 is a sectional view on the line 5—5 of FIGURE 2.

FIGURE 6 is a plan view of the blank used to make the carrier of FIGURE 1.

FIGURE 7 is the first of a series of assembly steps used to fold the simple precut and scored blank, shown in detail in FIGURE 6, to form the carrier of FIGURE 1.

FIGURE 8 shows a second step of such series of steps particularly showing that the entire adhesive action takes place along a substantially continuous adhesive strip means.

FIGURE 9 shows a third step of such series of assembly steps particularly showing the manner of folding the top portion of the precut and scored blank to define handle means.

FIGURE 10 shows a fourth step of such series of assembly steps.

FIGURE 11 illustrates a final step in finally erecting the improved carrier of this invention.

FIGURE 12 illustrates the manner of using rod means to push outer foldable flap means in the finally erected carrier of FIGURE 11 to define bottle receiving opening means.

FIGURE 13 is a fragmentary perspective view illustrating the manner of inserting a central bottle within the carrier as shown in FIGURE 12 and particularly showing the manner of folding central foldable flap means of such carrier inwardly by the action of the associated bottle.

While the various features of this invention are hereinafter illustrated and described as being particularly adaptable for providing a carrier for bottle-like container means such as bottles of beverages and to an improved method of making such carrier, it is to be understood that the various features of this invention can be utilized singly or in any combination thereof to provide carriers or carton means for other products and other uses as desired.

Therefore, this invention is not to be limited to only the embodiments illustrated in the drawings, because the drawings are merely utilized to illustrate one of the wide variety of uses of this invention.

In the examplary embodiment of this invention as illustrated in FIGURES 1-6 an improved carrier means or carrier 20 is illustrated, as well as an improved blank, shown in FIGURE 6, for making such carrier. Carrier 20 of this example is constructed to carry a plurality of six bottle-like container means or bottles each designated by the numeral 21 therewithin. However, it will be appreciated that carrier 20 may be constructed to carry four, six, eight or any other desired even number of bottle-like container means therewithin.

Carrier 20 has a central vertical partition designated generally by the numeral 23 which is comprised of a pair of layers each designated by the numeral 24 which preferably extend over its full vertical height. Tubular compartment means shown as a pair of identical tubular compartments each designated generally by the numeral 30 are fastened on opposite sides of central vertical partition 23.

Each tubular compartment 30 is fastened to its associated vertical layer 24 along a single continuous adhesive strip means which in this example of the invention is provided along the upper inner end portion, shown at 31, of each tubular compartment 30. This arrangement makes it possible to adhesively fasten carrier 20 together in a simple manner which lends itself to high volume production. Each tubular compartment 30 also has a pair of open opposite end means each deignated by the numeral 32 and opening means in its upper portion for receiving bottles 21 therethrough so that the bottom surface of such bottles is supported on lower inside surface means of each compartment 30.

Handle means is provided in carrier 20 and in this example of the invention such handle means is provided in the upper central portion of partition 23 and is designated generally by the numeral 33. The manner of forming handle means 33 so as to provide a strong support for carrier 20 and its bottles 21 will be described in detail subsequently.

Each tubular compartment 30 is of substantially rectangular outline and has a substantially horizontal bottom and top wall means or top wall designated respectively by the numerals 35 and 36 and substantially vertical spaced apart side wall means defined by an outer vertical wall designated by the numeral 37 and an inner wall 38 having a lower end defined by a portion of its associated structural layer 24.

Each compartment 30 is defined by extension flap means extending from bottom edge means of its associated layer 24 and such bottom edge means is defined by a score line 42. Each extension flap means extending from bottom edge 42 is folded in a substantially U-shaped outline having a base portion which defines outer wall 37 and a pair of parallel leg portions which define bottom wall 35 and top wall 36 of each compartment as previously mentioned.

Fastening flap means shown as a fastening flap 43 extends from the terminal inner end or edge of the upper one of each of such parallel legs and hence extends from the inner end of top wall 36. The major central portion of each fastening flap 43 is fastened substantially coplanar with its associated structural layer 24 to thereby completely define tubular compartment 30 on each side of central vertical partition 23 and, in this example, it will be seen that the upper portion of side wall 38 of each compartment 30 is comprised in part by portions of fastening flap 43.

As previously mentioned, opening means is also provided in top wall means 36 of each compartment 30 and such opening means comprises outer opening means which are provided in each compartment 30 adjacent its outer ends and designated in each instance by the numeral at 44. Each outer opening 44 is defined by a first set of cooperating cut and score means in top wall means 36 and in the upper end portion of each side wall 37 and 38 of compartment 30, see FIGURES 6 and 12.

The first set of cooperating cut and score means defining each outer opening 44 of each compartment 30 defines foldable flap means having a main portion designated by the numeral 46 which is folded substantially vertically and approximately coplanar with an associated end edge means of its associated compartment 30. Each main flap portion 46 defines top vertical support means (i.e., vertical support at the top portion of each compartment 30) for an associated bottle 21 to be inserted therewithin.

The first set of cooperating cut and score means defining opening 44 comprises a rectilinear cut designated by the numeral 47 extending across top wall means 36 perpendicular to central vertical partition 23. Cut means 47 also extends a limited dimension shown at 47A and 47B in the upper end portion of each side wall 37 and 38, respectively. Angled cut means designated by the numerals 48A and 48B extend downwardly at an angle from the terminal lower end of cut portions 47A and 47B respectively toward the associated near end of each associated compartment 30.

The score means provided in top wall means 36 defining outer opening 44 comprises a pair of symmetrically arranged score lines each designated by the numeral 49 so as to define the previously mentioned main portion 46 which is trapezoidal in peripheral outline and a pair of adjoining triangular portions each designated by the numeral 46A.

Each side wall 37 and 38 also has score means comprised of a rectilinear score line 50A and 50B extending from the terminal lower end of score line 48A and 48B respectively to the top outer edge of compartment 30. Each cut 47A and 48A cooperates with score line 50A in side wall 37 and with the top outer edge of compartment 30 to define an area of approximately triangular outline which is designated by the numeral 51A. Similarly, each cut 47B and 48B cooperates with score line 50B to define a similar area in side wall 38 of each compartment 30 which is also of substantially triangular outline and designated by the numeral 51B. As seen in FIGURE 12 of the drawings, upon pushing flap 46 inwardly flap portions 51A and 51B respectively are folded substantially coplanar and beneath their original position in their assiocated side wall 37 and 38 respectively.

Each compartment 30 has a second set of cooperating cut and score means in its top wall means 36 which defines a cooperating pair of flap means or flaps each designated by the numeral 54. Such second cooperating set of cut and score means comprises a substantially H-shaped cut designated by the numeral 55 and provided in the central portion of top wall means 36 and score means as will be presently described.

Each H-shaped cut 55 has the terminal ends of its parallel leg portions arranged inwardly in a symmetrical manner toward the center portion of the H-shaped outline and each terminal end is designated by the numeral 56. Each portion 56 of each parallel leg portion of H-shaped cut 55 terminates on a score line designated by the numeral 60 and provided in top wall means 36. Thus, it is seen that a pair of score lines 60 are provided in parallel spaced apart relation in top wall means 36 of each compartment 30 and arranged on opposite sides of the central interconnecting portion of H-shaped cut 55 so that such central portion, in effect, bisects the area between score lines 60.

As seen particularly in FIGURE 13 of the drawings, each foldable flap 54 is adapted to be folded inwardly by an associated bottle 21 striking thereagainst so as to define inner opening means or an inner opening designated by the numeral 61. Of course, it will be appreciated that in the event carrier 20 was constructed to carry more than six bottles such as eight, for example, then it would be necessary to provide another inner opening means similar to inner opening means 61 within the outer openings 44 provided in each compartment 30 in a manner essentially as described in connection with the manner of forming and defining inner opening 61 of this example of the invention.

Another set of cooperating cut and score means is provided adjacent opposite ends of each compartment 30 and particularly in bottom wall 35 and adjoining portions of side walls 37 and 38 to define lower support means or a lower substantially vertically arranged support for each end bottle 21 and such lower vertically arranged support comprises a central flap portion designated by the numeral 64. Each lower vertical support means is defined by a rectilinear cut 65 which extends completely across bottom wall 35 and is arranged substantially parallel to its associated end edge and a pair of score lines in bottom wall 35 each designated by the numeral 66 and each extending from an outer corner of bottom wall 35 toward the center of such bottom wall and into engagement with rectilinear cut 65 so as to define lower central support 64 which is substantially trapezoidal in peripheral outline.

Each side wall 37 and 38 has triangular flap means or portion 70A and 70B respectively defined therein which enable support portion 64 to be vertically arranged at each end of each compartment 30. Triangular flap 70A is formed by a score line 71A extending inwardly from the terminal end of side wall 37 at an upwardly inclined angle and a rectilinear cut 72A which extends from the terminal inner end of score line 71A downwardly and into engagement with an associated end of rectilinear cut 65. Triangular portion 70B is similarly defined in side wall 38 and comprises a score line 71B similar to score line 71A and a rectilinear cut 72B also similar to cut 72A.

Thus, it is seen that initially each compartment 30 is defined by substantially continuous surface means as seen in FIGURES 11 and 12 and then suitable cut and score means in each compartment enable folding portions of compartment wall means so as to define bottle receiving opening means. Those portions of folded compartment wall means are also effectively utilized to provide a support means for the bottles 21 carried within carrier 20.

Carrier 20 can be formed in any suitable manner and made from any suitable foldable material. It is preferably formed from the blank 80, illustrated in FIGURE 6 of the drawings. Blank 80 is made of cardboard, or the like, having a side such as the exposed surface thereof laminated with metallic foil, such as aluminum-containing metallic foil, or the like, suitably colored, embossed, imprinted, or remaining plain as desired.

Blank 80 is of rectangular outline and substantially every portion within the outer periphery of the rectangular outline is used to define carrier 20. Thus, carrier 20 is made with minimum waste of material yet it has optimum strength and is uniquely and rapidly assembled.

Blank 80 is effectively divided in half along a central axis designated generally by the numeral 81 and a score or fold line 75 is arranged along the central portion of axis 81 while an elongated substantially continuous cut means 83 extends from one terminal end of fold line 75 to one edge of blank 80 and another substantially continuous elongated cut means 84 extends from the opposite end of fold line 75 to the opposite edge of rectangular blank 80.

Each cut means 83 and 84 is interrupted at a few locations by integral tacking portions each designated by the numeral 85. The amount of material left at tacking locations 85 is comparatively short in length generally of the order of ⅛ of an inch, for example, and assures that blank 80 does not fall apart until such time as it is necessary to deliberately sever the tacking provided at locations 85 to enable assembly of blank 80 to define carrier 20.

Blank 80 also has score means shown as a series of rectilinear score means 91, 42, 93, 94, and 95 extending completely thereacross and defining a pair of extension portions 24A extending outwardly of score means 91, vertical support layers 24 extending between score means 91 and 42, bottom wall 35 of compartment means 30 extending between score means 42 and 93, side wall 37 of compartment means 30 extending between score means 93 and 94, top wall means 36 of compartment means 30 extending between score means 94 and 95, and fastening flap means 43 extending outwardly of score means 95. Portions 24A extending outwardly of score means 91 include integral holding means comprised of an oval opening 98 in one extension portion 24A and an integral oval flap means 100 in the other extension portion 24A which cooperates with another oval opening 98 in one support layer 24 and another flap means 100 in the other support layer 24 to hold the assembled carrier 20 together along the central portion of its vertical partition 23 and as will be apparent from the description to be presented later in this specification.

Adhesive means is applied outwardly of score means 95 and such adhesive means preferably comprises adhesive means such as glue, or the like. The adhesive means is applied in a substantially elongated strip means or strip across the full width of blank 80 and such elongated strip of glue is designated generally by the numeral 97. Strip 97 is of irregulator outline along its terminal edge in accordance with the application of means on fastening flap portion 43 to retard or completely eliminate the setting action of the adhesive or glue applied thereagainst and such portions are each designated by the numeral 43A and wil lbe completely defined in detail subsequently.

Upon folding blank 80 in half about its score means 75 and separating such blank by severing tacked portions 85 each folded half of blank 80 is substantially identical, with the exception of handle means 33 for carrier 20; therefore, the detailed description will proceed with reference to only one half of such blank with it being fully understood that the detailed description is fully applicable to both halves of such blank on opposite sides of central axis 81.

As previously mentioned, the only exception to this identical arrangement of blank 80 on opposite sides of central axis 81 is in the means defining handle means 33. As viewed in FIGURE 6 each portion 24 and 24A of blank 80 to the left of axis 81 has an oval opening therein designated by the numeral 98 and defined by an associated oval cut 99. Each portion 24 and 24A of blank 80 to the right of axis 81 also has integral oval flap means 100 provided therein defined by an approximately U-shaped cut designated by the numeral 101 with the base of flap 100 being defined by a score line 102 extending between the terminal open ends of U-shaped cut 101.

Upon folding carton 80 to define carrier 20, each extension portion 24A is overlapped against its associated layer 24. Openings 98 are thereby placed in aligned relation while flaps 100 are similarly placed in aligned relation with the outer lower periphery thereof being aligned with lower portions of openings 98, see FIGURES 9 and 10. Flaps 100 are then pushed through openings 98 provided in opposite wall portion 24 and its overlapped extension portion 24A so that the oval flaps 100 provide a large opening enabling one to insert his fingers therethrough to carry carrier 20. Flaps 100 also provide a fastening action for central vertical partition 23 along the central upper portion thereof. In addition, the folding of oval flaps 100 as described above defines a comparatively wide carrying surface to enable carrying carrier 20 with minimum discomfort to ones fingers by eliminating sharp edges.

In effect, each structural layer 24 comprising vertical partition means 23 of carrier 20 has substantially rectangular extension flap means designated by the numeral 103 extending outwardly of score line 42. Each extension flap means 103 extends from bottom edge means 42 of layer 24 and is adapted to be folded in a substantially U-shaped outline having a side portion which defines bottom wall 35 of rectangular compartment 30, a base portion 37 which is arranged substantially parallel to central vertical partition 23 in the assembled carrier 20, top wall means designated by the numeral 36 which is arranged parallel to base portion 35, and an extension flap or fastening flap 43 which is arranged coplanar with an associated layer 24 and is folded inwardly of top wall means 36 so that it extends within an associated compartment 30 of assembled carrier 20, see FIGURE 12 of the drawings. Each fastening flap 43, except for portions 43A thereof, is fastened by continuous adhesive strip 97 to an associated upper portion of an associated structural layer 24 so as to define compartment 30 extending from each side of central vertical partition 23.

The previously described outer opening means 44 provided at opposite ends of each compartment 30 is comprised of a first set of cooperating cut and score means defined by elongated rectilinear cut 47 extending completely across top wall means 36. A pair of cuts 47A and 47B in side wall 37 and flap portion 43 of side wall means 38 extend from opposite ends of elongated rectilinear cut 47, and angled cuts 48A and 48B extend at an angle from the terminal ends of cuts 47A and 47B respectively along associated side wall means 37 and 38. Symmetrically arranged score means 49 provided in top wall means 36 extend from opposite top corners thereof inwardly into engagement with elongated rectilinear cut 47 to define trapezoidal flap means 46 and its triangular portions 46A.

Each outer opening 44 in each compartment 30 is also defined by score means 50A in side wall 37 which is provided therein from the terminal end of elongated cut 48A to the upper corner of side wall 37. Similarly, score means 50B is provided in flap portion 43 comprising side wall means 38 which extends from the terminal end of cut line 48B to the upper corner edge of side wall means 38 in a similar manner as score means 50A.

In addition, each score means 94 and 95 has a cut portion designated by the numeral 94B and 95B respectively adjoining and extending inwardly of each cut 47. Cut portions 94B and 95B help define a flap portion 108 which enables provision of each opening 44 of assembled carrier 20 to full size as required to receive an associated bottle 21 therethrough.

Flap portion 108 in addition to enabling the provision of opening 44 to full size helps isolate an outer bottle from an adjoining central bottle in the assembled carrier. Each flap 108 is folded inwardly by the urging action of an associated bottle 21.

Top wall portion 36 of each flap 103 has a second set of cooperating cut and score means therein defining inner bottle receiving opening means 61 as previously described. Inner opening 61 is defined by a pair of parallel spaced apart score means each designated by the numeral 60 and arranged to extend substantially perpendicular to the terminal inner ends of parallel score means 94 and 95 and hence substantially perpendicular to central vertical partition 23 in the assembled carrier 20. Score means 60 cooperate with substantially H-shaped cut means 55 provided in the central portion of top wall means 36.

Each H-shaped cut means 55 is constructed so that its substantially parallel leg portions have converging terminal ends 56 which converge in a symmetrical manner toward an associated score means 60. Each H-shaped cut 55 together with score means 60 cooperate to define a pair of identical substantially trapezoidal flaps 54 which, in the assembled carrier 20 (see FIGURE 12), are pushed inwardly by an associated bottle 21 to be supported in opening 61.

Each substantially rectangular extension flap means 103 has a third set of cooperating cut and score means provided therein to define a lower vertical supporting means 64 in the bottom portion of each compartment 30 and at opposite ends thereof. Thus, it is seen that bottom wall portion 35 has symmetrically arranged score means 66 extending from its opposite corners at one end toward the central portion thereof and into engagement with an elongated rectilinear cut 65 extending across the full width of bottom wall 35. Score means 66 cooperate with central portion of rectilinear cut 65, associated outer terminal edges of bottom wall 35, and cut and score means in adjoining side walls 37 and 38 to define trapezoidal flap 64 which, as seen in FIGURE 1 of the drawings, is arranged substantially coplanar with upper trapezoidal flap 46 and substantially coplanar with an associated terminal end edge of tubular compartment means 30 to thereby define lower support means for an associated bottle 21 inserted within outer opening 44.

Cut and score means is also provided in adjoining portions of side wall means 37 and 38 to define the above mentioned lower supporting means. Thus, side wall 37 has score means 71A extending therein from a corner thereof at an angle and a cut line 72A extending from the terminal inner end of score means 71A into engagement with one end of rectilinear cut 65 provided in bottom wall 35. In a similar symmetrical manner, the lower portion of side wall means 38 defined by the lower portion of layer 24 also has score means 71B extending therein from a corner thereof at an angle and a cut 78B extending inwardly from the terminal inner end of score means 71B into engagement with the opposite end of rectilinear cut 65.

T8he terminal outer portions of each score line 42 and 93 in extension flap 102 are preferably defined by perforation means and the portion of such perforation means arranged outwardly of each cut 65 are designated respectively by the numerals 42A and 93A. Thus, it is seen that upon assemblying blank 80 to define carrier 20 the bottom portion at each end of each compartment 30 is folded about its cut and score means so that flap portions 70A and 70B are moved from their original position to a position substantially coplanar with their associated side wall means 37 and 38 respectively enabling the main flap portion 64 to be arranged substantially coplanar with top trapezoidal portion 46 to provide support for the lower end portion of an outer bottle 21 carried within assembled carrier 20.

Thus, it is seen that a simple blank is provided for forming carrier 20. Blank 20 is of rectangular peripheral outline and all portions within the peripheral outline of such blank are utilized to form carrier 20 so that such carrier has improved structural rigidity and provides desired opening means therein for receiving a plurality of bottles in each compartment. In this example of the invention, three bottles 21 are inserted within each compartment 30 and hence the overall carrier 20 is referred to as a six-pack.

The manner of assemblying blank 80 to form carrier 20 is particularly illustrated in FIGURES 7–12 of the drawings. Thus, it is seen that blank 80 is previously cut and scored using suitable cutting and scoring machinery which may be of any standard type. An elongated single continuous adhesive strip means is provided completely across fastening flap means 43 defining one terminal end portion of blank 80 and such adhesive strip means is designed by the numeral 97.

Suitable adhesive retarding or nonadhesive means is provided on flap portions 43A comprising each fastening flap 43. The need for glue retarder, or the like, for flap 43A will be readily apparent in connection with the simple technique utilized to assemble blank 80 to form improved carrier 20 of this invention.

Thus, as seen particularly in FIGURE 7 of the drawings, fastening flap 43 is folded coplanar with the remaining portion of the blank about fold line 95. This positions adhesive strip means 97 so that it is readily visible (i.e., faces upwardly) in FIGURE 7 of the drawings.

The next preferred step is to fold blank 80 about score means 93 compressing the folded portion flatly against the remaining portion of blank 80 so that fastening flap 43 is fastened in position substantially as illustrated in FIGURE 8 of the drawings. This step of fastening flap 43 in position against the remaining portion of blank 80 is the only required adhesive step, the remainder of the operation being strictly a routine assembly operation which is accomplished simply with minimum delay and hence at a reduced cost.

The next preferred step illustrates extension flap portion 24A of each vertical layer means 24 being folded in overlapping relation thereagainst as shown in FIGURE 9. This, in effect, defines the quadruple thickness upper portion of central partition 23.

Blank 80 is then, in effect, broken in half by folding about fold line 75 and tacking portions 85 provided therein are severed while simultaneously erecting each compartment 30 in the manner illustrated in FIGURES 10 and 11 of the drawings. Because the tacking provided at each location 85 is of such narrow length it is a simple matter to sever thereacross and completely erect each compartment means 30 on opposite sides of central vertical partition 23 defining carrier 20.

Also, as seen particularly in FIGURE 11 of the drawings, it will be seen that simultaneously with folding partially completed carrier 20 in position, oval extension flaps 100 are pushed through aligned openings 98 provided in the adjoining layers 24 and its extension portion 24A so as to hold central vertical partition 23 and hence assembled carrier 20 along the upper central portion thereof. Additional holding action is provided along folded edge 75 of carrier 20.

Having once assembled and fastened carrier 20 together as shown in FIGURE 12, automatic rod means shown as a plurality of rods each designed by the numeral 110 extend downwardly into engagement with trapezoidal flaps 46 and 64 which initially extend horizontally along top wall means 36 and bottom wall 35 respectively. Rods 110 may be actuated simultaneously so as to define upper opening means 44 at opposite ends of each compartment 30 simultaneously with pushing flap portions 64 substantially vertically and coplanar with associated upper supporting flaps 46.

Although, elongated rods 110 are only illustrated in association with one compartment 30 comprising carrier 20 it will be appreciated that such rod means 110 may be applied simultaneously along opposite sides of carrier 20 to simultaneously define outer openings 44 and the outer vertical support means 64 in both compartments 30 at the same time. The action may also take place in any predetermined sequence, such as, first providing top opening means 44 and then pushing each bottom supporting vertical flap 64 in any desired sequence.

Central opening 61 is opened by the action of an associated bottle 21 as it is inserted in position and this will be apparent from FIGURE 13 of the drawings. This action by each central bottle does not require the use of separate rod means to open flaps 54.

The foldable flaps 54 provided and defined in the central portion of each compartment 30 are defined by cut and score means therein as previously described; however, upon folding flaps 54 substantially vertically such flaps 54 serve as means for separating or isolating central bottle 21 from adjoining bottles The score means provided in the material used to form carrier 20 may be made in any suitable manner; however, in certain locations such score means are preferably defined by perforations means comprised of aligned rectilinear perforations or slits followed by solid material. In one application of this invention slits ⅛ of an inch long followed by ⅛ inch of solid material (and later referred to as ⅛ x ⅛ perforations) were successfully used. The use of this type of perforation makes it easier to assemble blank 80 to form carrier 20 when using comparatively stiff blank material.

The ⅛ x ⅛ perforations are preferably used to define each outer opening means 4 and its associated flap means, each central or inner opening means 61 and its associated flap means, and finally each vertical support flap means 64 and its adjoining flap means. Such ⅛ x ⅛ perforations are indicated in the blank as seen in FIGURE 6 by aligned slits of substantially uniform length followed by sections of solid material of about the same length.

Thus, it is seen that an improved carrier 20 has been provided from a rectangular blank 80 which is suitably cut and scored and has an elongated strip of adhesive means 97 applied thereon in such a manner that it can be applied in a continuous high volume production operation. Blank 80 is then folded in a simple predetermined sequence to thereby define carrier 20 which is of optimum simplicity and provides maximum structural rigidity.

Terms such as "central," "bottom wall," "side wall," "top wall," "top," "bottom," "upwardly," "downwardly," and the like, have been used in this disclosure of the invention merely for ease of description and to correspond to the arrangement of the various components as illustrated in the drawings and such terms should not be considered as limiting the scope of this invention in any way.

Thus, it is seen that this invention provides an improved carrier of simple and economical construction and which is held together by a single substantially continuous adhesive strip means.

Further, this invention provides an improved method of making such a carrier in a simple and inexpensive manner.

In addition, this invention provides improved blanks for making such a carrier, or the like.

While the form of the invention now preferred has been disclosed as required by statute, other forms may be used, all coming within the scope of the claimed subject matter which follows.

What is claimed is:

1. A carrier for a plurality of bottle-like container means comprising, a central vertical partition having first and second adjoining structural layers extending over its full vertical height, said structural layers being foldably fastened together along a vertically arranged side edge, substantially rectangular extension flap means extending from bottom edge means of each of said structural layers, each of said extension flap means being folded in a substantially U-shaped outline having a base portion arranged substantially parallel to said central partition and a pair of parallel legs extending substantially perpendicular thereto, fastening flap means extending from the terminal end of the upper one of each of said parallel legs and being fastened substantially coplanar with its associated structural layers thereby defining tubular compartment means having a substantially rectangular peripheral outline and open ends and arranged on each side of said central partition, opening means in the upper portion of each of said compartment means for receiving said container means therethrough and enabling the bottom of said container means to be supported on lower inside surface means of said compartment means, said opening means comprising outer opening means adjacent each of said open ends and each outer opening means being defined by a first set of cooperating cut and score means in said top wall means and the upper end portion of each of said side wall means defining first flap means, said first flap means comprising a main portion which is folded substantially vertically and approximately coplanar with an associated end edge of said tubular compartment means to define upper vertical support means for an associated container means, said opening means further comprising inner opening means defined by a second set of cooperating cut and score means in said top wall means defining a pair of second flap means which is folded within said compartment means, said inner opening means receiving container means carried in said compartment means inwardly of said outer opening means, a third set of cooperating cut and score means in said bottom wall means and adjoining lower portions of said side wall means arranged adjacent each open end and each defining third flap means which is folded within said compartment means and defines lower vertical support means for said container means, said third flap means having a major portion which is folded substantially vertically and is arranged substantially coplanar with said upper support means, said upper and lower vertical support means assuring an associated container means is held within said carrier and handle means in said central vertical partition means to enable easy carrying of said carrier.

2. The carrier as set forth in claim 1 in which each of said fastening flap means is folded within an associated tubular compartment means to define an upper end portion of one of said side wall means and is fastened in position against its associated structural layer along a single continuous adhesive strip means.

3. The carrier as set forth in claim 1 in which each first set of cut and score means in each compartment means outlines a roughly triangular area in said fastening flap means which has coating means for preventing adhesion thereof against said associated structural layer to enable folding thereof beneath its original position while folding said main portion of said first flap means to define said upper vertical support means.

4. A blank being cut and scored to define a resulting carrier for a plurality of bottle-like container means said blank comprising, first and second foldably connected structural layers being adapted to be folded in overlapping relation along a common side edge to define a vertical side edge and a vertical central partition in said resulting carrier which extends the full height thereof, substantially rectangular extension flap means extending from bottom edge means of each of said structural layers, each of said extension flap means being adapted to be folded in a substantially U-shaped outline in said resulting carrier and defining a base portion arranged substantially parallel to said central partition and a pair of parallel legs extending substantially perpendicular thereto, fastening flap means extending from the terminal outer end of each of said extension flap means and being adapted to be fastened substantially coplanar with its associated structural layer thereby defining tubular compartment means having a substantially rectangular peripheral outline and open ends and arranged on each side of said central partition in said resulting carrier, cut and score means in said blank being adapted to define opening means in the upper portion of each of said compartment means of said resulting carrier for receiving said container means therethrough and enabling the bottom of said container means to be supported on lower inside surface means of said compartment means, said cut and score means comprises a first set of cooperating cut and score means in said top wall means and the upper end portion of each of said side wall means adjacent each end of each compartment means of said resulting carrier, each of said first set of cut and score means defining first flap means, said first flap means comprising a main portion which is adapted to be folded substantially vertically and approximately coplanar with an associated end edge of said tubular compartment means of said resulting carrier to define upper vertical support means for an associated container means, said cut and score means further comprising a second set of cooperating cut and score means in said top wall means of each compartment means defining a cooperating pair of second flap means which is adapted to be folded within said compartment means of said resulting carrier to define inner opening means for receiving container means supported in said compartment means inwardly of said outer opening means, a third set of cooperating cut and score means in said bottom wall means and adjoining lower portions of said side wall means adjacent each end of each compartment means of said resulting carrier with each third set defining third flap means which is adapted to be folded within said compartment means of said resulting carrier, said third flap means having a major portion which is folded substantially vertically and is arranged substantially coplanar with said upper support means of said resulting carrier, said upper and lower vertical support means of said resulting carrier assuring an associated container means is held therewithin, and handle means provided in said central vertical partition of said resulting carrier to enable easy carrying of said carrier.

5. A blank as set forth in claim 4 and further comprising adhesive means applied on surface means of each fastening flap means to enable fastening each fastening flap means against its associated structural layer and within the rectangular outline of its associated tubular compartment means in said resulting carrier.

References Cited
UNITED STATES PATENTS

| | | | |
|---|---|---|---|
| 2,337,197 | 12/1943 | Holy | 220—111 |
| 2,382,844 | 8/1945 | Arneson | 220—112 |
| 2,491,039 | 12/1949 | Fortunato | 220—115 |
| 2,524,517 | 10/1950 | Cole | 220—114 |
| 2,540,066 | 1/1951 | Williamson | 220—114 |
| 2,540,067 | 1/1951 | Williamson | 220—114 XR |
| 2,689,061 | 9/1954 | Gray | 220—113 |
| 2,703,189 | 3/1955 | Weiss | 220—114 |
| 3,028,044 | 4/1962 | Cochran | 220—113 |

DAVIS T. MOORHEAD, *Primary Examiner.*

U.S. Cl. X.R.

229—28